(12) United States Patent
Vonroth

(10) Patent No.: US 10,821,830 B2
(45) Date of Patent: Nov. 3, 2020

(54) AGRICULTURAL VEHICLE

(71) Applicant: AGCO International GmbH, Neuhausen (CH)

(72) Inventor: Daniel Vonroth, Betzigau (DE)

(73) Assignee: AGCO International GmbH, Neuhausen (CH)

( * ) Notice: Subject to any disclaimer, the term of this patent is extended or adjusted under 35 U.S.C. 154(b) by 99 days.

(21) Appl. No.: 16/222,182

(22) Filed: Dec. 17, 2018

(65) Prior Publication Data

US 2019/0184827 A1     Jun. 20, 2019

(30) Foreign Application Priority Data

Dec. 20, 2017 (GB) .................................. 1721501.3

(51) Int. Cl.
*B60K 35/00* (2006.01)
*E02F 9/20* (2006.01)
(Continued)

(52) U.S. Cl.
CPC .............. *B60K 35/00* (2013.01); *A01B 76/00* (2013.01); *B60K 37/06* (2013.01); *E02F 9/2004* (2013.01); *E02F 9/2012* (2013.01); *B60K 2370/111* (2019.05); *B60K 2370/119* (2019.05); *B60K 2370/12* (2019.05); *B60K 2370/122* (2019.05);
(Continued)

(58) Field of Classification Search
CPC  B60K 35/00; B60K 37/06; B60K 2370/1537; B60K 2370/122; B60K 2370/111; B60K 2370/119; B60K 2370/1523; B60K 2370/61; B60K 2370/12; B60K 2370/135; B60K 2700/00;
(Continued)

(56) References Cited

U.S. PATENT DOCUMENTS

2008/0252600 A1 * 10/2008 Hagner .............. G05G 9/04788
345/161

FOREIGN PATENT DOCUMENTS

DE   10 2016 105909 A1   10/2017
EP         1714847 A2   10/2006
(Continued)

OTHER PUBLICATIONS

UK Intellectual Property Office, Search Report for related UK Application No. GB1721501.3, dated Jun. 11, 2018.
(Continued)

*Primary Examiner* — Muhammad Shafi

(57) ABSTRACT

A vehicle control device incorporating at least one vehicle control element and a vehicle terminal is disclosed, the at least one vehicle control element being adapted to control a functionality of a vehicle implement or tool, the vehicle terminal incorporating a terminal display, the terminal display being adapted to alter the functionality of the vehicle implement or tool associated with the vehicle control element, the terminal display also indicating the functionality associated with the vehicle control element, wherein the vehicle control element incorporates a vehicle control display element, the vehicle control display element indicating whether the functionality of the vehicle control element has been altered. This enables a driver when looking at the vehicle control element easily to see from the vehicle control display element whether the functionality of the vehicle control element has been altered.

3 Claims, 1 Drawing Sheet

(51) Int. Cl.
*B60K 37/06* (2006.01)
*A01B 76/00* (2006.01)

(52) U.S. Cl.
CPC *B60K 2370/135* (2019.05); *B60K 2370/1523* (2019.05); *B60K 2370/1537* (2019.05); *B60K 2370/188* (2019.05); *B60K 2370/61* (2019.05); *B60K 2700/00* (2013.01)

(58) Field of Classification Search
CPC .............. B60K 2370/188; E02F 9/2012; E02F 9/2004; A01B 76/00
USPC .......................................................... 701/50
See application file for complete search history.

(56) References Cited

FOREIGN PATENT DOCUMENTS

| | | | |
|---|---|---|---|
| EP | 2557238 | * | 2/2013 |
| EP | 2557238 A1 | | 2/2013 |
| EP | 2923540 A1 | | 9/2015 |

OTHER PUBLICATIONS

European Patent Office, Search Report for related EP Application No. 18210808.4, dated Apr. 26, 2019.

\* cited by examiner

AGRICULTURAL VEHICLE

BACKGROUND OF THE INVENTION

Field of Invention

The present invention relates to an agricultural vehicle and in particular to a control device for controlling hydraulic lines connected to functional units of the agricultural vehicle.

Description of Related Art

Agricultural vehicles such as tractors are conveniently provided with multiple hydraulic and electrical connections to the front, middle and/or rear of the vehicle. Various tools or working implements may be attached to the vehicle using these connections. Various control systems for such vehicles are known which enable control of the functionality of the tools or implements attached to the vehicle in this manner. Control elements for such systems include joysticks, levers or switch elements. It is known for the hydraulic connections to be color coded. It is also known for the vehicle control elements to include a fixed color indication. Typically, the color on the vehicle control element corresponds to the color of the hydraulic connection used. However, for many reasons, including driver preference, the functionality controlled by the individual vehicle control elements can be changed. It is known for the control system also to include a terminal incorporating a terminal display, so that a user can use the terminal to assign the desired alternative functionality to the vehicle control elements and this change in functionality is then indicated on the terminal display.

There is a requirement that an indication of the functionality of the vehicle control elements is displayed to the operator. Where the color on the vehicle control element corresponds to the color of the hydraulic connection this is self-evident. Where a functionality has been altered this is shown on the display.

Nevertheless, it is a problem that a user may forget that the functionality of a given vehicle control element has been altered and does not conduct a check using the terminal display for any change in functionality.

It is an advantage of the present invention that it seeks to provide a solution to this problem.

SUMMARY OF THE INVENTION

According to a first aspect of the present invention, a vehicle control device comprises at least one vehicle control element and a separate vehicle terminal, the at least one vehicle control element adapted to control a functionality of a vehicle implement or tool, the vehicle terminal incorporating a terminal display, the terminal display being adapted to alter the functionality of the vehicle implement or tool associated with the or each vehicle control element, the terminal display also indicating the functionality associated with the or each vehicle control element, wherein the or each vehicle control element incorporates a vehicle control display element, the vehicle control display element indicating whether functionality of the respective vehicle control element has been altered.

This has as an advantage that the driver when looking at the vehicle control element in order to operate the vehicle control element can easily see from the vehicle control display element whether the functionality of the vehicle control element has been altered. If there has been no change the driver need take no further action. If there has been a change the driver consults the separate terminal display to conduct a check and determine the nature of the altered functionality.

Preferably the vehicle control display associated with the or each of the at least one vehicle control elements displays a unique color associated with its initial assigned functionality and when any of the vehicle control elements is assigned a different functionality, the vehicle control display associated with the or each of the vehicle control elements assigned a different functionality displaying a further unique color indicative of an altered functionality.

Preferably, the at least one vehicle control element comprises one or more of a plurality of rocker switches, a lever and/or a joystick.

Preferably, the or each display element is illuminated by an LED or OLED.

According to a second aspect of the present invention, an agricultural vehicle comprising a plurality of hydraulic lines each comprising a hydraulic valve and a hydraulic connection, each hydraulic connection being provided with a unique color code, and a vehicle control device according to the first aspect of the invention.

Preferably the unique color code of each hydraulic connection corresponds to the unique color assigned to each of the vehicle control display elements associated with the initial assigned functionality.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

In an agricultural vehicle such as a tractor it is known to provide multiple hydraulic and electrical connections to the front, middle and/or rear of the tractor. It is known for the hydraulic connections or couplings to be color coded. Various tools or working implements may be attached to the vehicle using these connections. Control of the valves associated with these hydraulic connections, and so control of the attached tools or implements, is achieved by way of vehicle control elements located within the operator environment or cabin of the tractor.

Figure 1:
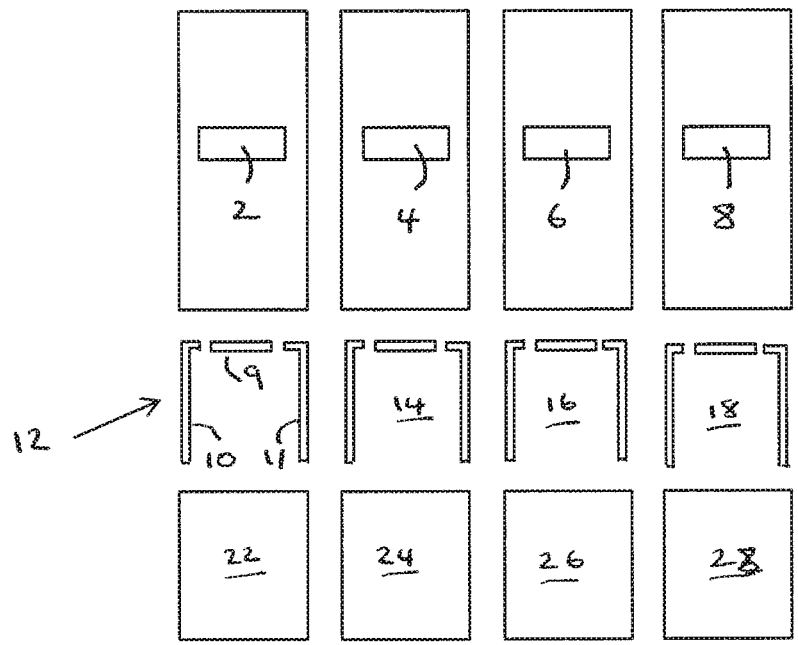
FIG. 1 shows a schematic plan view of part of a vehicle control device in accordance with the present invention.

With reference to FIG. 1, there can be seen a plan view of part of a vehicle control device in the form of a control panel incorporating a plurality of vehicle control elements 2,4,6,8 in which each of the vehicle control elements 2,4,6,8 are assigned an initial functionality. In the illustrated embodiment the vehicle control elements 2,4,6,8 take the form of four rocker switches 2,4,6,8. Each rocker switch 2,4,6,8 is shown in a neutral floating position and may be moved up or down to actuate a valve to increase or decrease the pressure in the hydraulic line associated with the rocker switch.

The control panel further comprises a vehicle control display 12,14,16,18 associated with each vehicle control element 2,4,6,8. The vehicle control display 12,14,16,18 may be located any suitable position that makes it clear that each vehicle control display 12,14,16,18 relates to an individual vehicle control element 2,4,6,8. In the illustrated embodiment, each vehicle control display 12,14,16,18 is located beneath the vehicle control element 2,4,6,8 with which it is associated.

The vehicle control displays 12,14,16,18 may take any desired form. In the illustrated embodiment, each vehicle control display 12,14,16,18 comprises three elements 9,10, 11: a crossbar 9 and two inverted L-shaped elements 10, 11 to each side of the crossbar 9. Each element of the vehicle control display 12,14,16,18 may be separately illuminated.

In a default configuration, each vehicle control display 12,14,16,18 is illuminated in a unique color associated with its initial assigned hydraulic connection and associated controlled functionality. By way of example, in the illustrated embodiment the first vehicle control display 12 may be illuminated in an orange color, the second vehicle control display 14 may be illuminated in a purple color, the third vehicle control display 16 may be illuminated in an olive color and the fourth vehicle control display 18 may be illuminated in a light blue color. In the default configuration, the first vehicle control element 2 is adapted to control the valve associated with the hydraulic connection or coupling also colored orange, the second vehicle control element 4 the hydraulic coupling also colored purple, the third vehicle control element 6 the hydraulic coupling also colored olive, and the fourth vehicle control element 8 the hydraulic coupling also colored light blue. Other vehicle control elements will be associated with a related vehicle control display colored to correspond to the associated hydraulic connection or coupling as will be discussed below.

Conveniently, the control panel may further comprise an additional control element or push button 22,24,26,28 associated with each combination of vehicle control element 2,4,6,8 and vehicle control display 12,14,16,18. The additional control element 22,24,26,28 may be used to lock or unlock the valve associated with the relevant hydraulic connection or coupling.

Also the vehicle control device includes further vehicle control elements in form of a control lever or joystick and/or a cross gate control which are both also equipped with a vehicle control display to indicate the current valve assignment.

The configuration of the vehicle control elements and the associated valves is also shown on a terminal within the operator environment of the tractor. The terminal may also be used to alter the configuration of the valves associated with the vehicle control elements.

Figure 2:
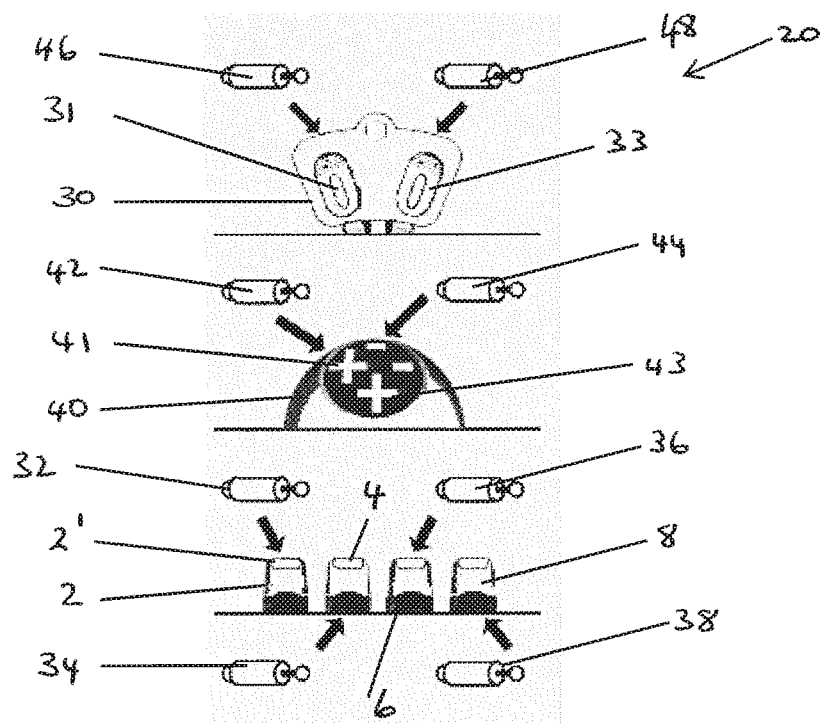
FIG. 2 shows part of a terminal display illustrating the relationship between the vehicle control elements and associated hydraulic valves.

FIG. 2 shows a portion of a terminal display 20, which is separate from the control elements 2,4,6,8 and vehicle control displays 12,14,16,18 and which shows a number of representations of the vehicle control elements 2,4,6,8,30,40 associated with the valves corresponding to the relevant colored hydraulic connection or coupling. Iconic or symbolic representations of the valves 32,34,36,38,42,44,46,48 are also included with arrows indicating the relationship between each valve 32,34,36,38,42,44,46,48 and the vehicle control element 2,4,6,8,30,40 depicted. In the illustrated embodiment, the vehicle control elements represented are a control lever or joystick 30 and a cross gate control 40 as well as the four rocker switches 2,4,6,8 of FIG. 1.

It can be seen that in the case of the rocker switches 2,4,6,8 corresponding reference numerals have been used to refer to corresponding parts, for example the same reference numeral 2 is used to refer to the left most rocker switch of FIG. 1 and the left most representation of the rocker switch in FIG. 2.

The representation of the first rocker switch 2 includes a marking 2' corresponding to the default orange color and is associated with a valve colored orange. The representations of the other rocker switches also carry or include a marking corresponding to the default color associated with the corresponding valve.

At the top of FIG. 2, a representation of a vehicle control element in the form of a lever or joystick 30 includes markings 31,33 corresponding to a default green color and a default red color, each associated with a respective green colored valve 46 and a red colored valve 48. Beneath this there is shown a representation of a vehicle control element in the form of a crossgate lever 40 which includes markings 41,43 corresponding to a default blue color and a default yellow color, each associated with a respective blue colored valve 42 and a yellow colored valve 44.

As noted above, the terminal may be used to alter the functionality assigned to the each valve. By way of example, the functionality associated with the middle two rocker switches 4,6 may be swapped by a driver. The vehicle control displays 12,18 associated with the first and fourth vehicle control elements 2,8 remain unchanged and each retains their unique color. In other words, the first vehicle control display 12 remains illuminated in an orange color and the fourth 18 remains illuminated in a light blue color.

However, in order to illustrate the altered functionality, the second and third vehicle control displays 14,16 are now illuminated in a further unique color, for example turquoise. In contrast, the terminal display now shows the changed functionality, in that the valve 34 pointed at the second rocker 4 is now colored olive and the valve 36 pointed at the third rocker 6 is now colored purple.

From reading the present disclosure, other modifications will be apparent to persons skilled in the art. Such modifications may involve other features which are already known and component parts therefore and which may be used instead of or in addition to features already described herein.

The invention claimed is:
1. A vehicle control device comprising a plurality of vehicle control elements and a separate vehicle terminal, the vehicle control elements each adapted to control a functionality of a vehicle implement or tool, the vehicle terminal incorporating a terminal display, the terminal display being adapted to alter the functionality of the vehicle implement or tool associated with each vehicle control element, the terminal display also indicating the functionality associated with each vehicle control element, wherein each vehicle control element incorporates a vehicle control display, the vehicle control display indicating whether functionality of the respective vehicle control element has been altered,
   wherein the vehicle control display associated with each of the vehicle control elements displays a unique color associated with its initial assigned functionality and when any of the vehicle control elements is assigned to a different functionality, the vehicle control display associated with the or each of the vehicle control elements assigned a different functionality displays a further unique color indicative of an altered functionality.

2. The vehicle control device according to claim 1, wherein at least one vehicle control element comprises one or more of a plurality of rocker switches, a lever and/or a joystick.

3. The vehicle control device according to claim 1, wherein the or each display element is illuminated by an LED or OLED.

* * * * *